Patented Oct. 3, 1944

2,359,698

UNITED STATES PATENT OFFICE 2,359,698

METHOD OF TREATING AQUEOUS DISPERSIONS OF RUBBER

Edwin C. Uhlig, Cranston, R. I., assignor to United States Rubber Company, New York, N. Y., a corporation of New Jersey No Drawing. Application March 29, 1941, Serial No. 385,856

12 Claims. (Cl. 260—821)

This invention relates to methods of treating aqueous dispersions of rubber, and more particularly to coagulating aqueous dispersions of rubber which have been stabilized against coagulation by acid.

Natural rubber latices are oftentimes compounded with suspensions and emulsions of compounding ingredients which contain protectives primarily to maintain the compounding ingredients in a dispersed condition, but these stabilizers may also stabilize the latex against coagulation by acid. Artificially prepared dispersions of crude and reclaimed rubber likewise may often contain protectives for the compounding ingredients or for the dispersed rubber particles. These protectives inhibit or may prevent entirely, the coagulation of the rubber particles in the dispersion when treated with acidic materials which would normally coagulate the dispersed particles. Various artificial dispersions of synthetic rubbers as supplied commercially by the manufacturers thereof contain stabilizers which prevent satisfactory coagulation by addition of acid. Examples of such artificial dispersions of synthetic rubbers are the so-called neoprene latices, which are aqueous dispersions of polymerized chloro-2-butadiene 1,3; Perbunan or Buna latices which are made by the controlled co-polymerization of butadiene and another polymerizable substance such as acrylic nitrile or styrene in an aqueous medium; and Hydrhoplex dispersions which are aqueous dispersions of polymerized methyl methacrylate. Where such aqueous dispersions of natural or synthetic rubber containing stabilizers which prevent coagulation by acid are to be used in manufacturing processes wherein it is desired to acid coagulate the dispersion, as in dipping processes, it is necessary to make the dispersions sensitive to coagulation by acid.

A common type of stabilizer used with compounded natural latices and with aqueous dispersions of crude, or reclaimed, or synthetic rubbers, has the general formula R—SO$_3$—M, wherein R represents an organic radical containing at least one group having more than 8 carbon atoms, and M represents alkali metal, hydrogen, or ammonium radical. I have found that aqueous dispersions of a rubber containing this type of stabilizer can be made sensitive to coagulation by acid by means of organic polyamines. By the term "polyamine" is meant an amine having more than one amino group titratable with strong acid. Various polyamines, such as ethylene diamine, propylene diamine, paraphenylene diamine, metaphenylene diamine, m-toluene diamine, diethylene diamine (piperazine), diethylene triamine, and triethylene tetramine, are capable of apparently inactivating stabilizers having the general formula

R—SO$_3$—M as above described so that they are no longer capable of protecting aqueous dispersions of rubber in acid media, thereby permitting aqueous dispersions of rubber containing such stabilizers to be coagulated by acidic materials.

Various stabilizers having the general formula R—SO$_3$—M as defined above are illustrated as follows with reference to a classification for the radical R:

(1) Where R is an alkoxy group producing, as for example, various compounds from $C_{10}H_{21}O$—SO$_3$Na to $C_{18}H_{37}O$—SO$_3$Na, known commercially under the trade names Gardinol, Duponol, Aquarex D, Orvus WA.

(2) Where R is an alkyl group producing, as for example in the formulae $C_{12}H_{25}$—SO$_3$Na and $C_{16}H_{33}$—SO$_3$Na, lauryl sodium sulphonate and cetyl sodium sulphonate, respectively.

(3) Where R is a mixed ether of long and short chain aliphatic groups, as for example in the compound $C_{17}H_{33}$—O—$C_2H_4$—SO$_3$Na, believed to be the material known commercially as Nacconal LA.

(4) Where R is an alkyl ester of a long chain fatty acid, as for example in the compound

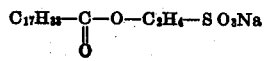

known commercially by the trade names Igepon A and Arctic Syntex A.

(5) Where R is a glycol ester of a long chain fatty acid, as for example in the formula

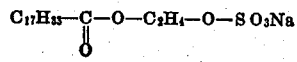

(6) Where R is an alkyl substituted amide of a fatty acid, as for example in the compounds

and

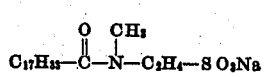

believed to be the commercial products Igepon T and Igepon TF, respectively.

(7) Where R is an alkyl substituted aromatic radical as in various commercial compounds having the formula

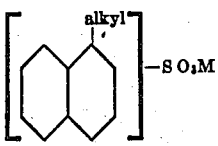

as for example, the sodium salts of alkyl naphthalene sulphonic acids, known under the trade names Nekal and Alkanol; a free alkyl naphthalene sulphonic acid, known commercially as Leonil SBS; the potassium salt of an alkyl naphthalene sulphonic acid known under the trade name Eunaphthol K.

(8) Where R is a hydroaromatic radical, as for example in the compound

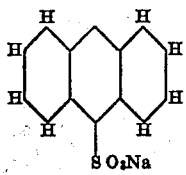

known under the trade name Octaton. Also where R is a hydroaromatic radical as in various commercial compounds having the formula

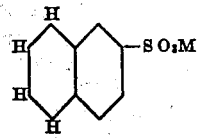

as for example, where M is sodium as in Alkanol S and Mayamin; where M is potassium as in Mayaminkalium; and where M is ammonium as in Mayammonium.

(9) Where R is an ester of a dibasic acid, such as

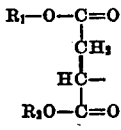

in which one of $R_1$ and $R_2$ may be an alkyl radical from $C_3H_7-$ to $C_8H_{17}-$ and the other is hydrogen, or both $R_1$ and $R_2$ are such alkyl radicals, as for example in the commercial stabilizer known as Aerosol OT which has the formula

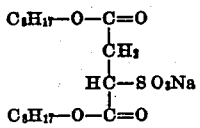

The various stabilizers having the general formula $R-S_3O-M$ as defined aforesaid and as illustrated above, are inactivated by organic polyamines in acid media so that the association of an aqueous dispersion of a rubber containing such a stabilizer with a polyamine and an acid will coagulate the dispersion. Up to 2% of such stabilizers, based on the solids of the dispersion, is the amount generally used to stabilize an aqueous dispersion of rubber.

The amount of polyamine to render an aqueous rubber dispersion containing such stabilizer sensitive to coagulation by acid is not critical. Satisfactory results have been obtained with as little as .25% of polyamine based on the solids content of the dispersion, and with as high as 10% without adversely affecting the stability of the rubber dispersion in the absence of the acid.

Where it is desired to produce a rubber article by a dipping process, for example, a form of the desired shape may be dipped into a bath of the rubber dispersion containing the stabilizer and thereafter the coated form may be associated with the organic amine and acidic material to coagulate the rubber on the form. These operations may be repeated as desired to build up the desired thickness on the form. If desired, the form may be dipped into a solution of the organic amine and acidic material, then dipped in the aqueous dispersion of rubber containing the stabilizer, to build up the desired thickness of rubber. Alternatively, of course, either the acid or the amine may be added to the rubber dispersion containing the stabilizer and the form treated with the other before or after dipping into the rubber dispersion. The articles may be made by similar spraying or spreading processes. The methods of making shaped rubber articles by dipping processes, where the rubber solids of the dispersion are coagulated in the shape desired on a form, are well known. The invention is not limited, however, to such processes, but may be utilized whenever it is desired to coagulate an aqueous dispersion of rubber containing a stabilizer of the general formula $R-SO_3-M$, as defined aforesaid, by means of acid to form a coherent sheet or layer of rubber. The following examples are illustrative of the present invention:

Example 1.—A glazed porcelain glove form was dipped into a commercial neoprene latex having a 48.5% solids content. The neoprene latex contained about .6% of Aquarex D, which is a stabilizer of the general formula $R-SO_3-M$, as above described, namely, the mono sodium sulphate ester of one-half lauryl and one-half myristyl alcohol. The form coated with the fluid neoprene latex was then dipped into a coagulant bath containing 40% water, 30% ethyl alcohol, and 30% glacial acetic acid. The neoprene latex did not coagulate appreciably on the form. One part of ethylene diamine per 100 parts of neoprene solids was added to the neoprene latex (as a 73% aqueous solution), and a form was dipped into the thus treated neoprene latex and then into the same coagulant, whereupon the film of neoprene compound on the form coagulated sharply to form a thin coherent film of the solid neoprene. The dipping of the form into the latex containing the ethylene diamine and into the coagulant bath, was repeated until the desired thickness of neoprene had been built up. The thus formed neoprene glove was allowed to partially dry on the form and subsequently stripped for further and complete drying.

Example 2.—A dipping form was dipped into a dipping compound made from a commercial Perbunan latex. The Perbunan latex was an aqueous dispersion of a co-polymer of butadiene and acrylic nitrile and was believed to contain Igepon T as the stabilizer. The dipping compound had the following formula:

| | Parts by weight (wet) |
|---|---|
| Perbunan latex (40% solids) | 250 |
| 10% aqueous solution dimethyl amine oleate | 15 |
| 25% aqueous carbon black paste | 4.8 |
| 62.5% aqueous sulphur paste | 3.2 |
| 50% aqueous mercaptobenzothiazole paste (accelerator) | 2.0 |

The form coated with the above compound was then dipped into a coagulant bath containing 50% acetic acid and 50% ethyl alcohol. The Perbunan did not appreciably coagulate on the form. 1.4 parts of a 73% solution of ethylene diamine were added to the above Perbunan compound and the form then dipped into the thus modified Perbunan compound with the added polyamine and then into the same coagulant. The Perbunan latex, in this case, coagulated sharply on the form. The coagulum was dried and vulcanized.

Example 3.—A glove form covered with a fabric glove was dipped into a commercial Hydrhoplex dispersion having a 25% solids content and believed to contain a stabilizer which is a sulphonated hydrocarbon of the general formula R—SO₃—M, as above described. The form with the fabric glove coated with the fluid Hydrhoplex dispersion was then dipped into a coagulant bath containing 50% glacial acetic acid and 50% ethyl alcohol. The Hydrhoplex did not coagulate appreciably on the glove surface. This was repeated with the same Hydrhoplex dispersion but using as the coagulant the above acetic acid-alcohol mixture to which had been added 10 parts of triethylene tetramine per 100 parts of coagulant. The Hydrhoplex dispersion in this case coagulated sharply, leaving on the glove surface a uniform layer of coagulum which was dried subsequently.

Example 4.—A dipping form was dipped into a natural rubber latex containing 1.2% ammonia which was compounded according to the following formulation:

| | Parts by weight (dry) |
|---|---|
| Rubber (as 39% solids latex) | 100 |
| Sulphur | 2 |
| Zinc oxide | 2 |
| Mercaptobenzothiazole (accelerator) | .5 |
| Aquarex D | 1.5 |
| Make up to 35% solids | |

The form coated with the fluid latex was dipped into a normally effective coagulant bath containing equal volumes of glacial acetic acid and ethyl alcohol. The latex coagulated on the form only slowly and incompletely to form a crumbly coagulum. Two parts of diethylene triamine per 100 parts of rubber were then added (as a 20% solution) to the latex, and the form was dipped into the thus modified latex compound and then into the same coagulant bath as above. The latex, in this case, coagulated rapidly and completely on the form to a smooth coherent coagulum. The coagulum was dried and vulcanized in the usual manner.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of sensitizing to coagulation by acidic material an aqueous dispersion of a rubber of at least 25% solids concentration containing a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, which comprises adding to the dispersion organic polyamine selected from the group consisting of ethylene diamine, propylene diamine, paraphenylene diamine, metaphenylene diamine, m-toluene diamine, piperazine, diethylene triamine, and triethylene tetramine.

2. An aqueous dispersion of a rubber of at least 25% solids concentration containing a water-soluble organic polyamine selected from the group consisting of ethylene diamine, proplyene diamine, para-phenylene diamine, metaphenylene diamine, m-toluene diamine, piperazine, diethylene triamine, and triethylene tetramine, and a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium.

3. The method of coagulating an aqueous dispersion of a rubber of at least 25% solids concentration containing a stabilizer against coagulation of the dispersion by acid, which stabilizer is capable of being inactivated by organic polyamine selected from the group consisting of ethylene diamine, propylene diamine, para-phenylene diamine, metaphenylene diamine, m-toluene diamine, piperazine, diethylene triamine, and triethylene tetramine, so that it no longer protects the dispersion from coagulation by acid, which comprises intimately associating said dispersion with said organic polyamine and an acidic material.

4. The method of coagulating an aqueous dispersion of a rubber of at least 25% solids concentration which comprises intimately associating an aqueous dispersion of a rubber of at least 25% solids concentration with a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, an acidic material, and a polyamine selected from the group consisting of ethylene diamine, propylene diamine, para-phenylene diamine, metaphenylene diamine, m-toluene diamine, piperazine, diethylene triamine, and triethylene tetramine.

5. The method of coagulating an aqueous dispersion of a rubber of at least 25% solids concentration which comprises intimately associating an aqueous dispersion of a rubber of at least 25% solids concentration containing an acid material and a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, with organic polyamine selected from the group consisting of ethylene diamine, propylene diamine, para-phenylene diamine, metaphenylene diamine, m-toluene diamine, piperazine, diethylene triamine, and triethylene tetramine.

6. The method of coagulating an aqueous dispersion of a rubber of at least 25% solids concentration which comprises intimately associating an aqueous dispersion of a rubber of at least 25% solids concentration containing organic polyamine selected from the group consisting of ethylene diamine, propylene diamine, para-phenylene diamine, metaphenylene diamine, m-toluene diamine, piperazine, diethylene triamine, and triethylene tetramine, and a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, with an acidic material.

7. The method of coagulating an aqueous dispersion of a rubber of at least 25% solids concentration containing a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, which comprises intimately associating said dispersion with organic polyamine selected from the group consisting of ethylene diamine, propylene diamine, para-phenylene diamine, metaphenylene diamine, m-toluene diamine, piperazine, diethylene triamine, and triethylene tetramine, and an acidic material.

8. The process of producing a rubber article which comprises contacting an aqueous dispersion of a rubber of at least 25% solids concentration with a shaping surface and coagulating solids from the dispersion by means of an acidic material in the presence of organic polyamine selected from the group consisting of ethylene diamine, propylene diamine, para-phenylene diamine, metaphenylene diamine, m-toluene diamine, piperazine, diethylene triamine, and triethylene tetramine, and a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium.

9. The process of producing a rubber article which comprises contacting with a shaping surface an aqueous dispersion of a rubber of at least 25% solids concentration containing organic polyamine selected from the group consisting of ethylene diamine, propylene diamine, para-phenylene diamine, metaphenylene diamine, m-toluene diamine, piperazine, diethylene triamine, and triethylene tetramine, and a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and coagulating solids from said dispersion by means of an acidic material.

10. The process of producing a rubber article which comprises contacting with a shaping surface an aqueous dispersion of a rubber of at least 25% solids concentration containing an acidic material and a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and coagulating solids from the dispersion by intimately associating the dispersion with organic polyamine selected from the group consisting of ethylene diamine, propylene diamine, para-phenylene diamine, metaphenylene diamine, m-toluene diamine, piperazine, diethylene triamine, and triethylene tetramine.

11. The process of producing a rubber article which comprises contacting with a shaping surface an aqueous dispersion of a rubber of at least 25% solids concentration containing a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and coagulating solids from the dispersion by intimately associating the dispersion with organic polyamine selected from the group consisting of ethylene diamine, propylene diamine, para-phenylene diamine, metaphenylene diamine, m-toluene diamine, piperazine, diethylene triamine, and triethylene tetramine, and an acidic material.

12. The process of producing a rubber article which comprises dipping a form in an aqueous dispersion of a rubber of at least 25% solids concentration and coagulating solids from the dispersion by means of an acidic material in the presence of organic polyamine selected from the group consisting of ethylene diamine, propylene diamine, para-phenylene diamine, metaphenylene diamine, m-toluene diamine, piperazine, diethylene triamine, and triethylene tetramine, and a stabilizer having the general formula $R-SO_3-M$ wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium.

EDWIN C. UHLIG.